United States Patent
Takano

(10) Patent No.: US 10,560,927 B2
(45) Date of Patent: Feb. 11, 2020

(54) DOWNLINK QUALITY IMPROVEMENT METHOD AND APPARATUS

(71) Applicant: SONY CORPORATION, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/741,611

(22) PCT Filed: Jun. 10, 2016

(86) PCT No.: PCT/JP2016/067446
§ 371 (c)(1),
(2) Date: Jan. 3, 2018

(87) PCT Pub. No.: WO2017/047174
PCT Pub. Date: Mar. 23, 2017

(65) Prior Publication Data
US 2018/0213511 A1  Jul. 26, 2018

(30) Foreign Application Priority Data

Sep. 17, 2015  (JP) .................................. 2015-184307

(51) Int. Cl.
*H04W 16/32* (2009.01)
*H04W 24/02* (2009.01)
(Continued)

(52) U.S. Cl.
CPC ......... *H04W 72/042* (2013.01); *H04W 52/24* (2013.01); *H04W 24/08* (2013.01);
(Continued)

(58) Field of Classification Search
CPC . H04W 72/042; H04W 52/24; H04W 72/085; H04W 24/08; H04W 16/32;
(Continued)

(56) References Cited

U.S. PATENT DOCUMENTS

2010/0035645 A1  2/2010  Chang et al.
2010/0035653 A1  2/2010  Chang et al.
(Continued)

FOREIGN PATENT DOCUMENTS

JP  2011-130412 A  6/2011
JP  2013-017080 A  1/2013
(Continued)

OTHER PUBLICATIONS

Definition of "cut" by Merriam-Webster, https://web.archive.org/web/20150906031059/https://www.merriam-webster.com/dictionary/cut (Year: 2015).*
(Continued)

*Primary Examiner* — Moo Jeong
(74) *Attorney, Agent, or Firm* — Xsensus LLP

(57) ABSTRACT

[Object] To provide a mechanism capable of efficiently operating vast millimeter-wave band resources.
[Solution] Provided is an apparatus that operates a small cell, the apparatus including: a processing unit configured to improve a downlink quality of a unit frequency band used in the small cell by limiting resources used for downlink transmission.

12 Claims, 11 Drawing Sheets

(51) Int. Cl.
*H04W 24/08* (2009.01)
*H04W 52/24* (2009.01)
*H04W 52/34* (2009.01)
*H04W 72/04* (2009.01)
*H04W 72/08* (2009.01)

(52) U.S. Cl.
CPC ...... *H04W 72/046* (2013.01); *H04W 72/0453* (2013.01); *H04W 72/0486* (2013.01); *H04W 72/085* (2013.01)

(58) Field of Classification Search
CPC . H04W 72/04; H04W 52/34; H04W 72/0486; H04W 72/046; H04W 72/0453; H04W 24/02
See application file for complete search history.

(56) References Cited

U.S. PATENT DOCUMENTS

| | | |
|---|---|---|
| 2011/0176497 A1 | 7/2011 | Gopalakrishnan |
| 2011/0319126 A1 | 12/2011 | Chang et al. |
| 2013/0010749 A1 | 1/2013 | Chang et al. |
| 2013/0017857 A1 | 1/2013 | Chang et al. |
| 2014/0120933 A1 | 5/2014 | Kimura et al. |
| 2014/0211891 A1* | 7/2014 | Park .......... H04B 1/16 375/345 |
| 2015/0078261 A1 | 3/2015 | Yu et al. |
| 2015/0181440 A1* | 6/2015 | Chen .......... H04W 16/18 370/329 |
| 2015/0208415 A1* | 7/2015 | Xu .......... H04L 5/001 370/329 |
| 2016/0285578 A1* | 9/2016 | Webb .......... H04W 52/367 |

FOREIGN PATENT DOCUMENTS

| | | |
|---|---|---|
| JP | 2013-501386 A | 1/2013 |
| WO | WO 2014/170227 A1 | 10/2014 |

OTHER PUBLICATIONS

International Search Report dated Aug. 2, 2016 in PCT/JP2016/067446, filed Jun. 10, 2016.

Extended European Search Report dated Mar. 15, 2019, issued in corresponding European Application No. 16846047.5, 9 pages.

* cited by examiner

DOWNLINK QUALITY IMPROVEMENT METHOD AND APPARATUS

TECHNICAL FIELD

The present disclosure relates to an apparatus and a method.

BACKGROUND ART

Wireless communication environment in recent years faces a problem of a rapid increase in data traffic. Hence, in 3GPP, installing a large number of small cells in a macro cell to increase network density, thereby distributing traffic, has been under study. Such a technology utilizing small cells is referred to as small cell enhancement. Note that small cells may conceptually include various types of cells (e.g., a femto cell, a nano cell, a pico cell, a micro cell, and the like) that are smaller than a macro cell and are arranged to overlap a macro cell.

In addition, as one way to expand radio resources, utilization of a frequency band of 6 GHz or more, which is called the millimeter-wave band, has been under study. However, since the millimeter-wave band has strong straightness and exhibits large radio propagation attenuation, utilization in a small cell smaller than a macro cell is expected. On the other hand, since the millimeter-wave band is vast, in some cases, even frequency bands included in the same millimeter-wave band may have greatly different radio wave propagation characteristics, as typified by the radio wave propagation attenuation. For this reason, in the vast frequency band of the millimeter-wave band, it is anticipated that a measurement signal for enabling measurement of the downlink quality (hereinafter also referred to simply as the quality) on the terminal apparatus side will be transmitted from a base station. For example, Patent Literature 1 below discloses technology for efficiently executing a process related to a measurement report in accordance with service quality requirements in wireless transmission involving carrier aggregation.

CITATION LIST

Patent Literature

Patent Literature 1: JP 2011-130412A

DISCLOSURE OF INVENTION

Technical Problem

Herein, from the characteristic whereby even frequency bands included in the same millimeter-wave band may have greatly different radio wave propagation characteristics, as typified by the radio wave propagation attenuation, bias may occur in the millimeter-wave band, such as traffic being concentrated on a portion of the frequency resources. Such bias is not preferable, given the thinking of attempting to expand radio resources by introducing the millimeter-wave band. For this reason, it is desirable to provide a mechanism capable of efficiently operating vast millimeter-wave band resources.

Solution to Problem

According to the present disclosure, there is provided an apparatus that operates a small cell, the apparatus including: a processing unit configured to improve a downlink quality of a unit frequency band used in the small cell by limiting resources used for downlink transmission.

Further, according to the present disclosure, there is provided an apparatus that connects to a small cell, the apparatus including: a processing unit configured to measure a downlink quality of a unit frequency band used in the small cell, compute a measurement result of the downlink quality assuming a case in which a quality improvement process is performed by a base station, and report the measurement result to the base station on a basis of a result of the computation.

Further, according to the present disclosure, there is provided a method including: operating a small cell; and improving, by a processor, a downlink quality of a unit frequency band used in the small cell by limiting resources used for downlink transmission.

Further, according to the present disclosure, there is provided a method including: connecting to a small cell; and measuring, by a processor, a downlink quality of a unit frequency band used in the small cell, computing a measurement result of the downlink quality assuming a case in which a quality improvement process is performed by a base station, and reporting the measurement result to the base station on a basis of a result of the computation.

Advantageous Effects of Invention

According to the present disclosure as described above, there is provided a mechanism capable of efficiently operating vast millimeter-wave band resources. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
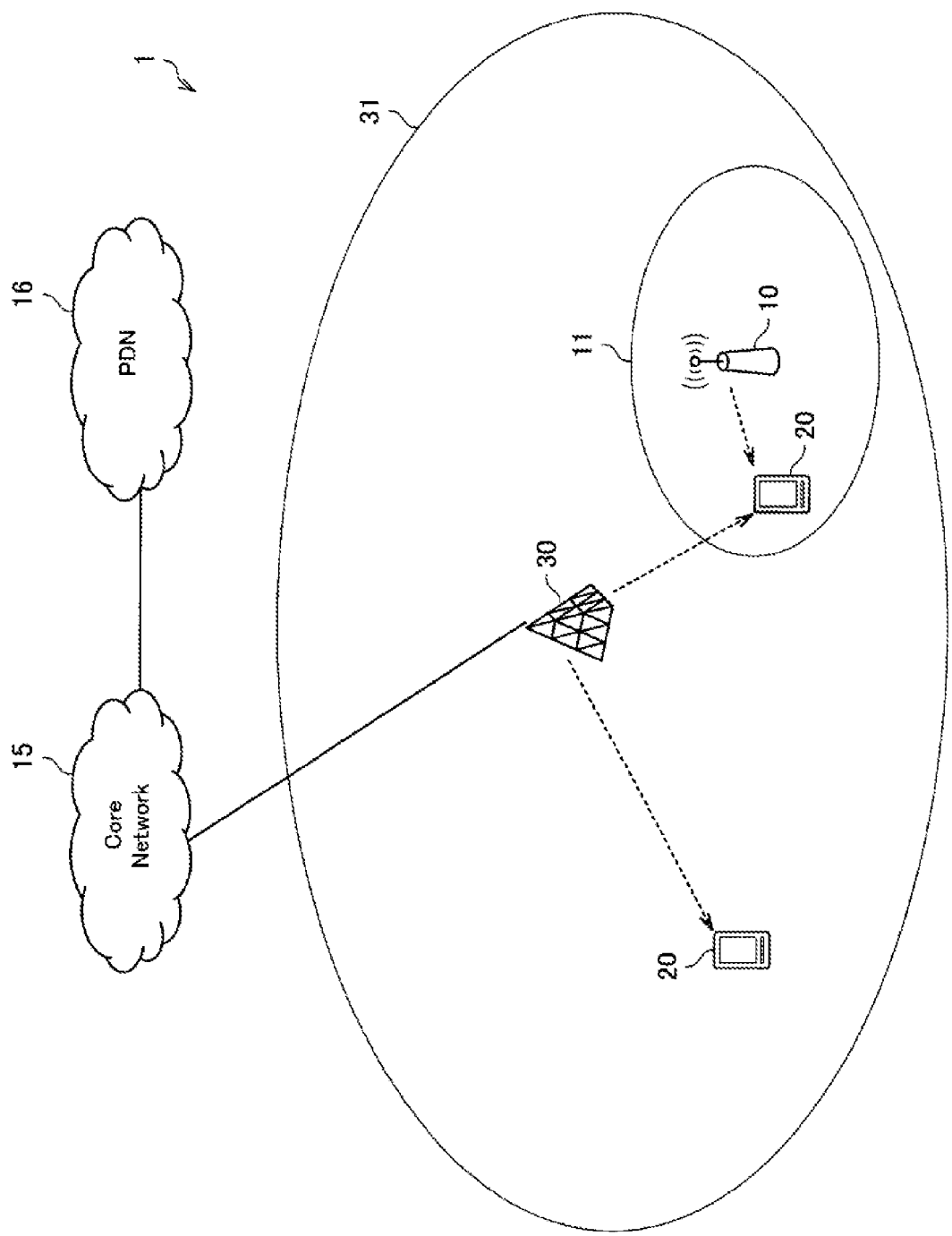
FIG. 1 is an explanatory diagram for describing an overview of a system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be given in the following order.
1. Introduction
    1.1. Small cell
    1.2. Carrier aggregation
    1.3. Considerations regarding millimeter-wave band
2. Configuration examples
    2.1. Configuration example of small cell base station
    2.2. Configuration example of terminal apparatus
3. First Embodiment
    3.1. Technical problems
    3.2. Technical features
    3.3. Flow of process
4. Second Embodiment
    4.1. Technical problem
    4.2. Technical features
    4.3. Flow of process
5. Application examples
6. Conclusion

1. INTRODUCTION

<1.1. Small Cell>

FIG. 1 is an explanatory diagram for describing an overview of a system 1 according to an embodiment of the present disclosure. As illustrated in FIG. 1, the system 1 includes a wireless communication apparatus 10, a terminal apparatus 20, and a communication control apparatus 30.

In the example of FIG. 1, the communication control apparatus 30 is a macro cell base station. The macro cell base station 30 provides a wireless communication service for one or more terminal apparatuses 20 located inside a macro cell 31. The macro cell base station 30 is connected to a core network 15. The core network 15 is connected to a packet data network (PDN) 16 via a gateway apparatus (not illustrated). The macro cell 31 may be operated in accordance with any wireless communication scheme, such as long term evolution (LTE), LTE-advanced (LTE-A), GSM (registered trademark), UMTS, W-CDMA, CDMA200, WiMAX, WiMAX2, or IEEE802.16, for example. Note that without being limited to the example of FIG. 1, a control node in the core network 15 or the PDN 16 (a host node of the macro cell base station) may have a function of controlling wireless communication in a macro cell and a small cell in a cooperative manner. Note that the macro cell base station may also be referred to as a Macro eNodeB.

The wireless communication apparatus 10 is a small cell base station that operates a small cell 11. Typically, the small cell base station 10 is authorized to allocate radio resources to the terminal apparatus 20 that connects to the own apparatus. However, allocation of radio resources may be at least partially entrusted to the communication control apparatus 30 for cooperative control. A wireless communication apparatus 20 may be a small cell base station fixedly installed as illustrated in FIG. 1, or may be a dynamic access point (AP) that dynamically operates the small cell 11. Note that the small cell base station may also be referred to as a pico eNB or a Femto eNB.

The terminal apparatus 20 connects to the macro cell base station 30 or the small cell base station 10 to enjoy a wireless communication service. For example, the terminal apparatus 20 that connects to the small cell base station 10 receives a control signal from the macro cell base station 30, and receives a data signal from the small cell base station 10. The terminal apparatus 20 is also called a user. The user may also be called user equipment (UE). Here, UE may be UE defined in LTE or LTE-A, or more generally may mean communication equipment.

<1.2. Carrier Aggregation>

A technology related to carrier aggregation prescribed in LTE Release 10 (that is, 3GPP Release 10) is described below.

(1) Component Carrier

Carrier aggregation is a technology of improving throughput of communication by forming a communication channel between a base station and a terminal apparatus by aggregating a plurality of unit frequency bands supported in LTE, for example. Individual unit frequency bands included in one communication channel formed by carrier aggregation are referred to as component carriers (CCs). Here, a CC may be a CC defined in LTE or LTE-A, or more generally may mean a unit frequency band.

In LTE Release 10, it is possible to aggregate five CCs at maximum. In addition, one CC has a width of 20 MHz. Note that the CCs to be aggregated may be arranged consecutively on a frequency axis, or may be arranged apart from each other. Moreover, which CC to aggregate and use can be set for each terminal apparatus.

The plurality of CCs that are aggregated are classified into one primary component carrier (PCC) and a secondary component carrier (SCC) other than the PCC. The PCC is different for each terminal apparatus. Since the PCC is the most important CC, it is desirable that the CC with the most stable communication quality be selected.

Figure 2:
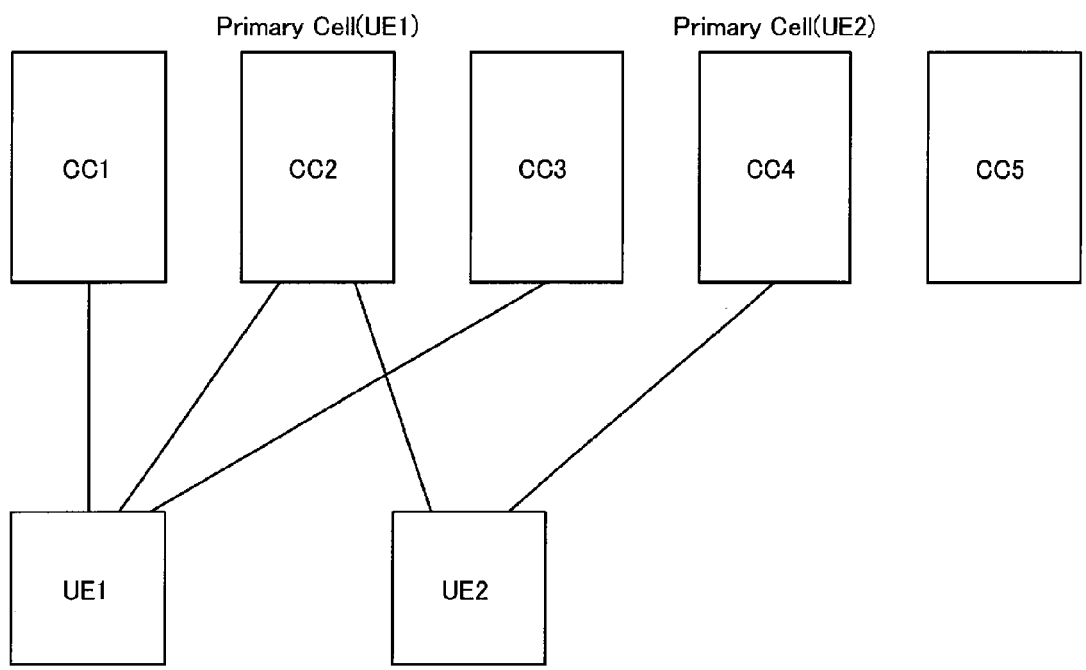
FIG. 2 is an explanatory diagram for describing component carriers.

FIG. 2 is an explanatory diagram for describing component carriers. In the example illustrated in FIG. 2, a situation in which two pieces of UE use some of five CCs in aggregation is illustrated. In detail, UE1 uses CC1, CC2, and CC3 in aggregation, and UE2 uses CC2 and CC4 in aggregation. Moreover, the PCC of UE1 is CC2. The PCC of UE2 is CC4.

Here, selection of a PCC is dependent on implementation. An SCC is changed by deleting the SCC and adding another SCC. That is, it is difficult to directly change an SCC.

(2) Formation and Change of PCC

In the case where a terminal apparatus transitions from an RRC Idle state to an RRC Connected state, the CC in which connection is established first is the PCC. A change of the PCC is performed through a procedure similar to handover.

A PCC is formed through a procedure called Connection establishment. This procedure is a procedure started with a request from the terminal apparatus side used as a trigger.

A PCC is changed through a procedure called Connection Reconfiguration. This procedure includes transmission and reception of handover messages. This procedure is a procedure started from the base station side.

(3) Addition of SCC

An SCC is added through a procedure called Connection Reconfiguration. This procedure is a procedure started from the base station side. An SCC is added to a PCC and belongs to the PCC. Adding an SCC is also referred to as activating an SCC.

(4) Deletion of SCC

An SCC is deleted through a procedure called Connection Reconfiguration. This procedure is a procedure started from the base station side. In this procedure, a specific SCC designated in a message is deleted. Note that deletion of an SCC is performed also through a procedure called Connection Re-establishment. This procedure is a procedure started from the terminal apparatus side. Through this procedure, all the SCCs are deleted. Deleting an SCC is also referred to as deactivating an SCC.

(5) Special role of PCC

A PCC has a special role different from that of an SCC. For example, transmission and reception of NAS signaling in Connection establishment is performed only in the PCC. In addition, transmission of a physical uplink control channel (PUCCH) is performed only in the PCC. Note that examples of an uplink control signal include ACK or NACK indicating success for failure of reception for data transmitted in downlink, a scheduling request, and the like. Moreover, a procedure from detection of Radio Link Failure to Connection Re-establishment is also performed only in the PCC.

(6) LTE Release 12

In LTE Release 12, a scenario is shown in which a macro cell base station and a small cell base station use different frequencies. For example, a frequency of approximately 2 GHz may be allocated to the macro cell base station, and a high frequency such as 5 GHz may be allocated to the small cell base station.

<1.3. Considerations Regarding Millimeter-Wave Band>

Hereinafter, considerations regarding the millimeter-wave band will be described.

(1) Definitions

Generally, radio waves from 3 GHz to 30 GHz (that is, wavelengths from 1 cm to 10 cm) are also called centimeter waves. Also, radio waves from 30 GHz to 300 GHz (that is, wavelengths from 1 cm to 1 mm) are also called millimeter waves. In addition, radio waves from 10 GHz to 30 GHz are also called quasi-millimeter waves. The millimeter-wave band in this specification refers to frequency bands of 6 GHz and higher from among the above. In other words, the concept of millimeter waves in this specification also includes typical centimeter waves.

(2) Relationship with Component Carriers.

The millimeter-wave band has vast frequency resources. For this reason, in the millimeter-wave band, it is anticipated that the CC bandwidth which had been set to 20 MHz in LTE Release 10, will become changeable to broader bandwidths, such as 40 MHZ, 80 MHz, or 160 MHz, for example.

(3) Line-of-Sight Communication

As the frequency becomes higher, wraparound of the radio waves no longer occurs, and the straightness becomes stronger. Also, as the frequency becomes higher, the attenuation when reflected also becomes greater. For this reason, it can be said that radio waves in the millimeter-wave band, particularly at 10 GHz and higher, should be expected to be used basically for line-of-sight communication.

(4) Radio Wave Propagation Loss Per Frequency Band

Typically, the radio wave propagation loss (that is, the path loss) increases and the radio waves attenuate in accordance with the square of the frequency. For example, the 20 GHz band has greater 12 dB attenuation than the 5 GHz band. The 60 GHz band has greater 22 dB attenuation than the 5 GHz band.

The millimeter-wave band straddles a vast band from approximately 6 GHz to 60 GHz, for example. The millimeter-wave band can be considered to have a vast band even compared to the 2 GHz band being used in LTE at the present time. Additionally, the properties of radio waves in the millimeter-wave band are not uniform due to the vastness, and in some cases even radio waves belonging to the same millimeter-wave band may have greatly different properties.

Among frequencies at 6 GHz and higher, it is known that as the frequency goes higher, radio waves become less likely to arrive. Consequently, in a case in which radio waves in the millimeter-wave band are used in a link between a UE and an eNB, there is no guarantee that the link will be maintained stably. For this reason, it is anticipated that radio waves of lower frequency will be used to perform control related to radio waves of higher frequency. Actually, in the investigation regarding small cells in LTE Release 12, a technology that uses CCs in the 2 GHz band to control CCs in the 5 GHz band has been discussed.

In the millimeter-wave band, resources exist over a broad range from approximately 6 GHz to 60 GHz. For this reason, even if one attempts to control this broad range of resources using CCs in the 2 GHz band, CC resources in the 2 GHz band may be insufficient.

(5) Change of Subcarrier Spacing

In LTE as of 3GPP Release 12, the subcarrier spacing of orthogonal frequency-division multiplexing (OFDM) is 15 kHz. This width of 15 kHz is defined to achieve flat fading in subcarrier units. For this reason, even if frequency-selective fading occurs overall (for example, a width of 20 MHz), flat fading occurs in subcarrier units. In this way, the width of 15 kHz brings about the merit of low characteristic degradation when receiving.

In the frequency band from 10 GHz to 60 GHz, the frequency width by which such flat fading can be expected to occur is predicted to be larger. For example, it is conceivably possible to change the subcarrier spacing, which was 15 kHz in the 2 GHz band, to 150 kHz in the 20 GHz band.

However, since this change of the subcarrier spacing exerts an extremely large impact on the LTE specification, being able to make the change without going through stages is not expected to be likely. For this reason, it is considered desirable to be able to change the subcarrier spacing in approximately the four stages of 15 kHz, 30 kHz, 60 kHz, and 120 kHz, for example. This is because making even more fine-grained changes is considered to have little effect despite being a large change in the specification. The table below illustrates an example of settings in the case in which the subcarrier spacing is changeable in four stages.

TABLE 1

| OFDM subcarrier spacing | Frequency | Frequency bandwidth of one CC | Number of CCs |
| --- | --- | --- | --- |
| 15 kHz | smaller than 10 GHz | 20 MHz | 30 |
| 30 kHz | 10 GHz to 30 GHz | 40 MHz | 400 |
| 60 kHz | 30 GHz to 60 GHz | 80 MHz | 400 |
| 120 kHz | Higher than 60 GHz | 160 MHz | 200 |

However, even if the OFDM subcarrier spacing is changeable in approximately four stages, the problem of the increased load on CCs in the low frequency band (for example, the 2 GHz band) is still unresolved. This is because the millimeter-wave band has vast frequency resources, and many control signals are necessary. Referring to Table 1 above, it is demonstrated that there are large numbers of CCs to be controlled which are included in the millimeter-wave band.

Note that the question of whether or not OFDM will be adopted at 60 GHz and higher still remains. However, even in the case of changing the handled signal scale to match the frequency band used, there are vast frequency resources, and the large number to be controlled is not open to question.

(6) Component Carrier Quality and Coverage

In carrier aggregation at the present time, the UE aggregates and uses multiple CCs belonging to nearly the same frequency band. In other words, the characteristics of the bandwidth and radio wave propagation loss of each of the CCs aggregated for use are the same. For this reason, even if there is a different in the CC quality (for example, the signal-to-noise ratio (SNR)), it is sufficient for the UE to simply select the CC to use.

Figure 3:
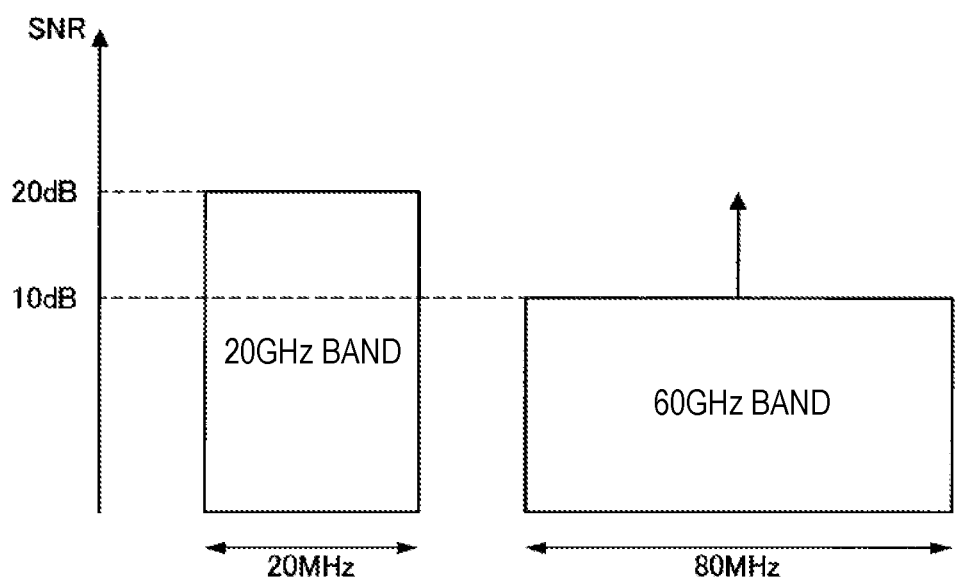
FIG. 3 is an explanatory diagram for explaining component carrier quality.

On the other hand, in a system that uses the millimeter-wave band, CCs belonging to various frequency bands, such as the 5 GHz band, the 10 GHz band, the 30 GHz band, and the 60 GHz band, for example, may be aggregated and used. For this reason, it can no longer be said that it is sufficient for the UE to simply select the CC to use. For example, with a CC in the 60 GHz band, even if the quality is worse than a CC in the 2 GHz band, a wider bandwidth compared to the 20 MHz bandwidth of the CC in the 2 GHz band may be provided. In this case, if measures could be taken to improve the quality of the CC in the 60 GHz band, the vast bandwidth would become usable, and thus it is anticipated that there would be demand to want to use the CC in the 60 GHz band. Such a situation is illustrated schematically in FIG. 3. In the example illustrated in FIG. 3, the SNR of the CC in the 2 GHz band is 20 dB, and the SNR of the CC in the 60 GHz band is 10 dB. For example, if the SNR of the CC in the 60 GHz band is improved to approximately 20 dB, demand to want to use the CC in the 60 GHz band may also occur.

The principle of LTE at the present time is to perform control using the 2 GHz band, and transfer user data using the 5 GHz band. This principle arises from the concept of attaching importance to the coverage of the 2 GHz band, and simply using the coverage of the 5 GHz band whenever available. For this reason, an apparatus that improves the quality of the 5 GHz band up to the same quality as the 2 GHz band has not been carried out.

In a system that uses the millimeter-wave band, the probability of frequency bands such as the 10 GHz band, the 30 GHz band, and the 60 GHz band being used not for control but for the transfer of user data is anticipated to be high. For this reason, in a case in which the 10 GHz band and the 60 GHz band are usable, for example, and there is an extremely large difference in quality, only CCs in the frequency band of better quality (for example, the 10 GHz band) will be used. This imposes a large load on the CCs of a specific frequency band. In other words, a situation that produces a difference in quality is not considered a desirable situation from the perspective of traffic offloading.

Also, in a case in which multiple CCs are being made to operate, but the performance of one is significantly low, the computational resources and power of the UE will be consumed wastefully. In other words, a situation that produces a difference in quality is not considered a desirable situation from the perspective of terminal load.

Figure 4:
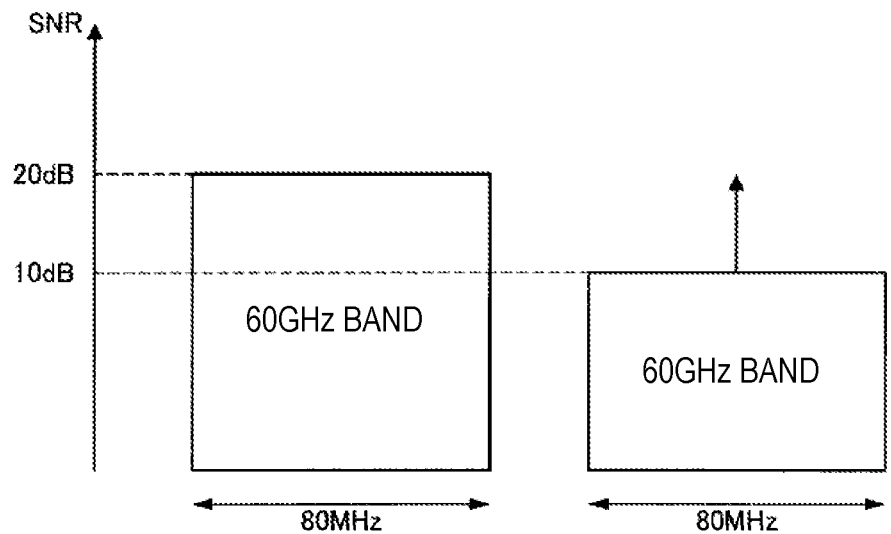
FIG. 4 is an explanatory diagram for explaining component carrier quality.

On the other hand, even CCs in the same 60 GHz band may have greatly different quality for each CC in some cases. Such a situation is also not considered a desirable situation from the above perspective of traffic offloading and the above perspective of terminal load. Such a situation is illustrated schematically in FIG. 4. In the example illustrated in FIG. 4, the SNR of a first CC in the 60 GHz band is 20 dB, and the SNR of a second CC in the 60 GHz is 10 dB. For example, if the SNR of the second CC is improved to approximately 20 dB, demand to want to use the second CC may also occur.

From the above, in a system that uses the millimeter-wave band, under conditions in which quality differences occur among CCs, it is desirable for measures to be taken to improve the quality of the CC of lower quality up to the same as the others.

(7) Appropriate Level of Quality Improvement

However, an appropriate level exists with regard to the quality improvement. For example, under conditions in which the noise level is extremely low, like −100 dB, there is little advantageous effect in making received powers of −50 dBm and −40 dBm uniform. This is because an SNR of 50 dB and 60 dB is ensured, respectively. Realistically, due to the influence of quantization noise and the like, achieving an SNR of 30 dB or more often has little meaning.

Given the above, it is desirable to achieve an SNR with consideration for quantization noise and the like. Consequently, in a case in which the UE is positioned close to the base station, quality improvement is considered unnecessary, even if there is a difference in the received power between two CCs. On the other hand, in a case in which the UE is positioned on the cell edge of a CC in a high frequency band, it is desirable to adjust the gain of the CC in the high frequency band and make the quality of the two CCs uniform. Note that the way of thinking that it is sufficient to make the CC quality uniform only in locations near cell edges is not suited to a system in which the millimeter-wave band is used. The reason is because, in the case in which beamforming is performed in the millimeter-wave band using several hundred antennas, the cell edge may vary on the order of several tens of dB due to adjustment of the antenna gain.

2. CONFIGURATION EXAMPLES

<2.1. Configuration Example of Small Cell Base Station>

Figure 5:
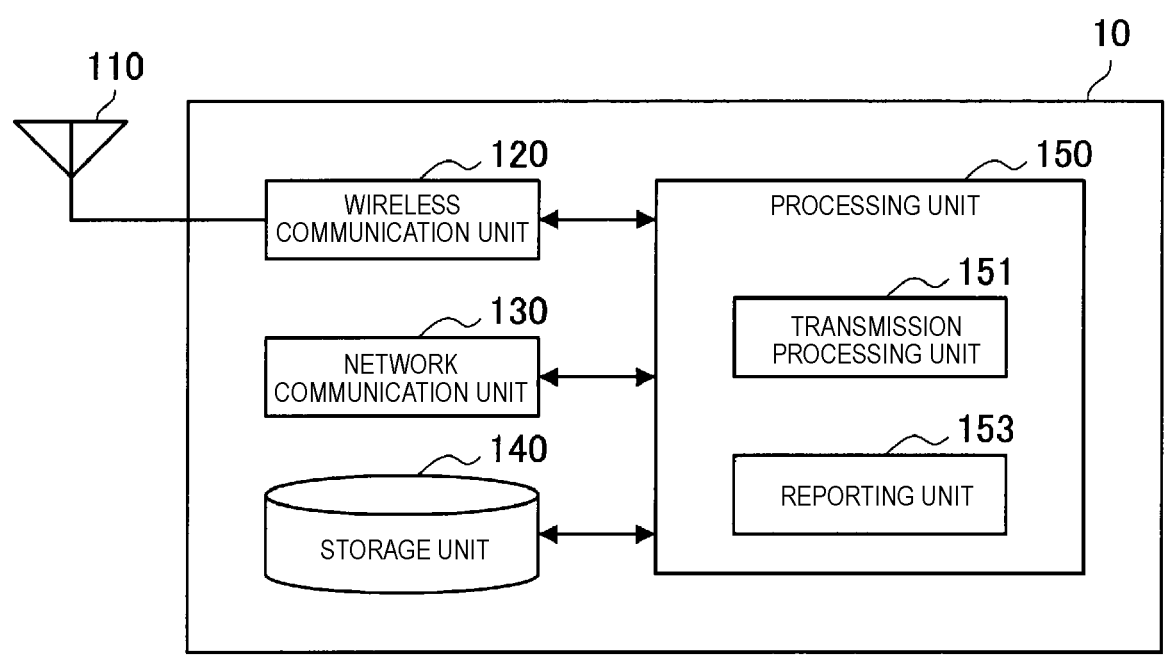
FIG. 5 is a block diagram illustrating an example of the configuration of a small cell base station according to the embodiment.

Next, the configuration of the small cell base station 10 according to an embodiment of the present disclosure will be described with reference to FIG. 5. FIG. 5 is a block diagram illustrating an example of the configuration of the small cell base station 10 according to an embodiment of the present disclosure. Referring to FIG. 5, the small cell base station 10 includes an antenna unit 110, a wireless communication unit 120, a network communication unit 130, a storage unit 140, and a processing unit 150.

(1) Antenna Unit 110

The antenna unit 110 radiates a signal output by the wireless communication unit 120, in the form of radio waves, into space. The antenna unit 110 also converts radio waves in space into a signal, and outputs the signal to the wireless communication unit 120.

(2) Wireless Communication Unit 120

The wireless communication unit 120 transmits and receives signals. For example, the wireless communication unit 120 transmits a downlink signal to the terminal apparatus and receives an uplink signal from the terminal apparatus.

(3) Network Communication Unit 130

The network communication unit 130 transmits and receives information. For example, the network communication unit 130 transmits information to other nodes and receives information from other nodes. For example, the other nodes include other base stations and a core network node.

(4) Storage Unit 140

The storage unit 140 temporarily or permanently stores a program and various data for operation of the small cell base station 10.

(5) Processing Unit 150

The processing unit 150 provides various functions of the small cell base station 10. The processing unit 150 includes a transmission processing unit 151 and a reporting unit 153. Note that the processing unit 150 may further include a structural element other than these structural elements. That is, the processing unit 150 may perform operation other than the operation of these structural elements.

The operation of the transmission processing unit 151 and the reporting unit 153 will be described in detail later.

<2.2. Configuration of Terminal Apparatus>

Figure 6:
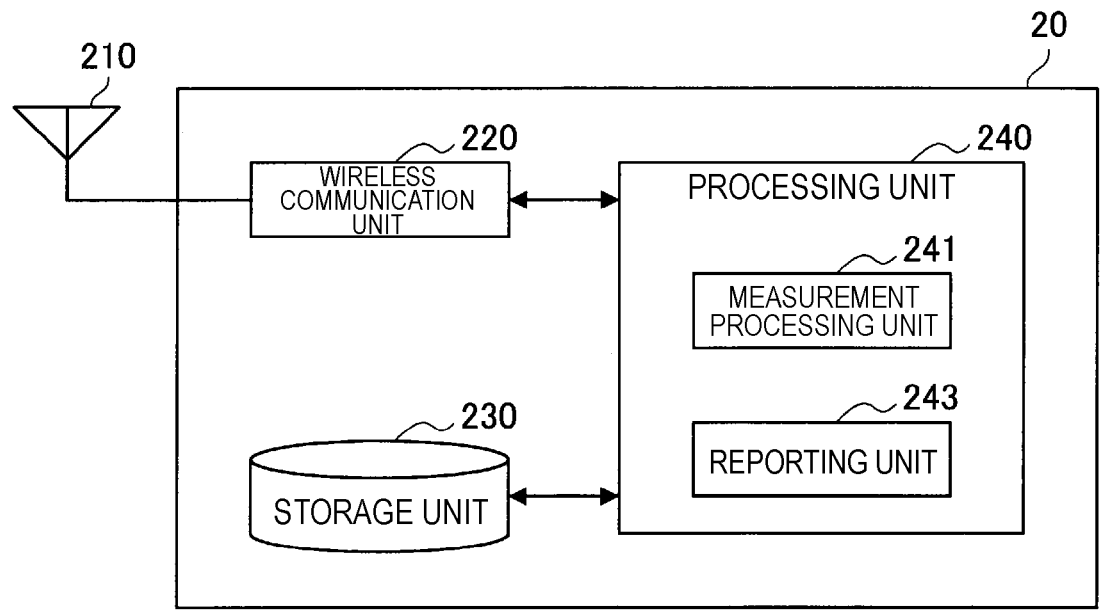
FIG. 6 is a block diagram illustrating an example of the configuration of a terminal apparatus according to the embodiment.

Next, an example of the configuration of the terminal apparatus 20 according to an embodiment of the present disclosure will be described with reference to FIG. 6. FIG. 6 is a block diagram illustrating an example of the configuration of the terminal apparatus 20 according to an embodiment of the present disclosure. Referring to FIG. 6, the terminal apparatus 20 includes an antenna unit 210, a wireless communication unit 220, a storage unit 230 and a processing unit 240.

(1) Antenna Unit 210

The antenna unit 210 radiates a signal output by the wireless communication unit 220, in the form of radio waves, into space. The antenna unit 210 also converts radio waves in space into a signal, and outputs the signal to the wireless communication unit 220.

(2) Wireless Communication Unit 220

The wireless communication unit 220 transmits and receives signals. For example, the wireless communication unit 220 receives a downlink signal from the base station and transmits an uplink signal to the base station.

(3) Storage Unit 230

The storage unit 230 temporarily or permanently stores a program and various data for operation of the terminal apparatus 20.

(4) Processing Unit 240

The processing unit 240 provides various functions of the terminal apparatus 20. The processing unit 240 includes a measurement processing unit 241 and a reporting unit 243. Note that the processing unit 240 may further include a structural element other than these structural elements. That is, the processing unit 240 may perform operation other than the operation of these structural elements.

The operation of the measurement processing unit 241 and the reporting unit 243 will be described in detail later.

3. FIRST EMBODIMENT

<3.1. Technical Problems>

A technical problem of the present embodiment is to realize efficient operation of carrier aggregation in the system 1 that uses the millimeter-wave band. Herein, "efficient" refers to avoiding the concentration of traffic on a specific CC due to the occurrence of bias in the CCs which are used, as described above. In other words, the present embodiment provides a mechanism capable of perform CC quality improvement, and making the quality uniform among multiple CCs.

<3.2. Technical Features>

(1) Quality Improvement

The small cell base station 10 (for example, the transmission processing unit 151) improves the downlink quality of a CC used in the small cell 11 by limiting the resources used for downlink transmission. Specifically, the small cell base station 10 (for example, the transmission processing unit 151) concentrates the transmit power on limited resources. With this arrangement, the CC quality is improved, and thus it becomes possible to make the quality uniform among CCs of high quality which could be used in concentration with CCs of poor quality.

Hereinafter, specific quality improvement processes will be described.

Figure 7:
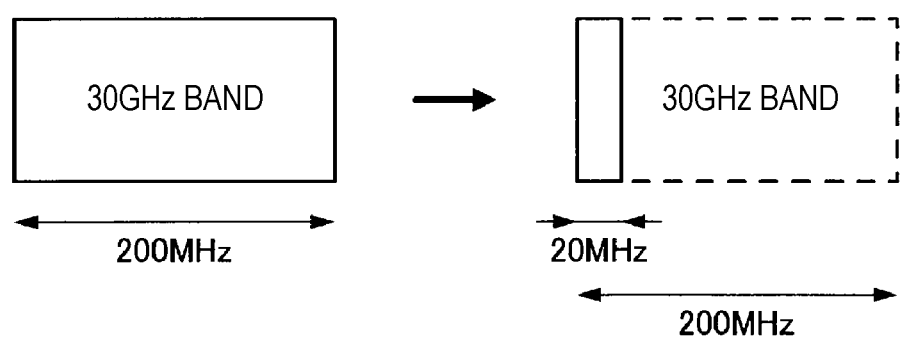
FIG. 7 is an explanatory diagram for describing a technical feature according to a first embodiment.

For example, as a first quality improvement process, the small cell base station 10 (for example, the transmission processing unit 151) may cut (that is, narrow) the bandwidth of a CC used for downlink transmission. Additionally, the small cell base station 10 concentrates the transmit power corresponding to the cut bandwidth on the narrowed bandwidth. With this arrangement, the CC quality is improved. FIG. 7 will be referenced to describe in further detail. Suppose a case as illustrated in FIG. 7, in which a CC with a bandwidth of 200 MHz in the 30 GHz band is the CC subjected to quality improvement. In this case, the small cell base station 10 selects a bandwidth of good quality, for example 20 MHz, from the above. Additionally, the small cell base station 10 concentrates into the 20 MHz width the transmit power that had been used originally over the 200 MHz width. With this arrangement, 10 times the transmit power becomes concentrated in the 20 MHz width, and thus a 10 dB quality improvement is realized. Note that a way of thinking that it is sufficient not to concentrate, but simply to add transmit power in the parts where the transmit power is insufficient may also seem possible. However, for the base station, in cases in which a maximum transmit power is not stipulated, the design of the overall cellular network as radio equipment is considered to be difficult, and for this reason such a way of thinking is inappropriate. Note that at the present time, a compulsory standard (that is, a law) allowing a process like cutting the CC bandwidth does not exist. For this reason, it is desirable to settle upon a new compulsory standard.

Figure 8:
FIG. 8 is an explanatory diagram for describing a technical feature according to the embodiment.

For example, as a second quality improvement process, the small cell base station 10 (for example, the transmission processing unit 151) may cut the number of CCs used for downlink transmission. Additionally, the small cell base station 10 concentrates the transmit power corresponding to the cut CCs on the reduced number of CCs. With this arrangement, the CC quality is improved. FIG. 8 will be referenced to describe in further detail. Suppose a case as illustrated in FIG. 8, in which 10 CCs (CC1 to CC10) are being used for downlink transmission. For example, as illustrated in FIG. 8, the small cell base station 10 deactivates the nine CCs from CC2 to CC10 among the 10 CCs, and concentrates the transmit power on the single remaining CC1. In the case in which the SNR of each of the 10 CCs is 10 dB, by concentrating the transmit power on a single CC, a 10 dB quality improvement is realized.

For example, as a third quality improvement process, the small cell base station 10 (for example, the transmission processing unit 151) may cut the number of beams used for downlink transmission. More specifically, the small cell base station 10 cuts the number of beams used at the same frequency and the same time. Additionally, the small cell base station 10 concentrates the transmit power corresponding to the cut beams on the reduced number of beams. With this arrangement, the CC quality is improved. For example, in the case in which the number of usable beams is 10, by limiting the beam used to one, the small cell base station 10 can increase the transmit power by approximately 10 dB compared to the case of using 10. This is because it is possible to concentrate the transmit power which had been distributed among the 10 beams. Note that beams directed towards another terminal apparatus 20 which are no longer multiplexed at the same time are used at a different frequency or a different time. In other words, it is desirable for the terminal apparatus 20 for which the number of beams is cut and the other terminal apparatus 20 not to be spatially multiplexed.

Note that the small cell base station 10 may also execute a combination of the quality improvement processes described above.

Herein, the small cell base station 10 (for example, the transmission processing unit 151) may also improve the downlink quality of a CC subjected to quality improvement on the basis of the downlink quality of another CC treated as a target. For example, to improve the SNR up to the same as the SNR of one CC, the small cell base station 10 decides and executes the content (such as how many CCs to cut, for example) of the quality improvement process described above with regard to another CC. With this arrangement, the small cell base station 10 is able to make the quality uniform at a desired level among multiple CCs.

Also, in some cases a single CC is used in common by multiple terminal apparatus 20. In this case, the small cell base station 10 switches the destination terminal apparatus 20 in resource block units, for example. With this arrangement, the influence of the quality improvement process performed in relation to one terminal apparatus 20 is prevented from extending to another terminal apparatus 20. Note that the small cell base station 10 may treat only a CC used by a single terminal apparatus 20 as the subject of the quality improvement process, or in order to treat a CC used by multiple terminal apparatus 20 as the subject of the quality improvement process, the small cell base station 10 may cut the number of terminal apparatus 20 that use the CC.

In the case of performing the quality improvement process, the small cell base station 10 (reporting unit 153) may also report information indicating a process result to the terminal apparatus 20. For example, regarding the first quality improvement process, the small cell base station 10 reports information indicating how much the bandwidth of which CC is cut, and which bandwidth on which the power is concentrated. Also, regarding the second quality improvement process, the small cell base station 10 reports information indicating which CCs are cut, and which CC on which the power is concentrated.

(2) Preventing Interference

The small cell base station 10 (for example, the transmission processing unit 151) may also differentiate the resource-limiting content between the small cell 11 to operate and another neighboring cell (such as another small cell or a macro cell, for example). For example, regarding the above first quality improvement process, the small cell base station 10 differentiates the bandwidth on which to concentrate the transmit power for a specific CC from a neighboring cell. Also, regarding the above second quality improvement process, the small cell base station 10 differentiates the CC on which to concentrate the transmit power from a neighboring cell. With this arrangement, interference which may occur with a neighboring cell can be prevented.

This is because, since the quality improvement processes described above concentrate power into a specific region, interference with respect to neighboring cells may increase. However, in actuality, due to insufficient coverage, the influence on neighboring cells is not considered to be large.

In addition, the small cell base station 10 (for example, the transmission processing unit 151) may switch between limiting and not limiting resources, and in the case of limiting, switch the limiting content at intervals of a unit time. With this arrangement, interference which may occur with a neighboring cell is further prevented. For example, the unit time may be approximately the unit of an OFDM slot in LTE, namely 0.5 msec (milliseconds).

The above describes the technical features of the present embodiment. Next, the flow of the process will be described.

<3.3. Flow of Process>

Figure 9:
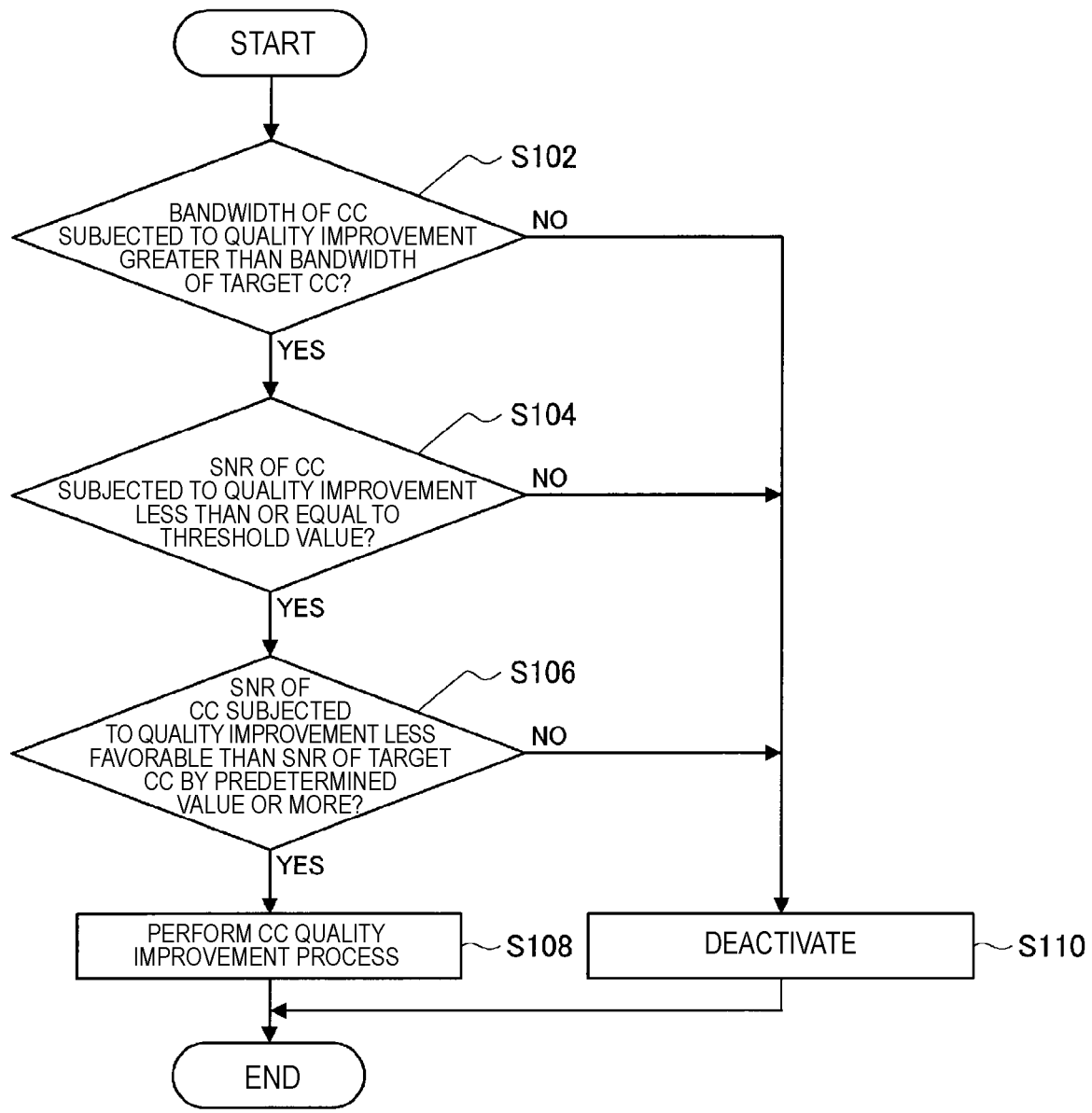
FIG. 9 is a flowchart illustrating an example of the flow of a quality improvement determination process executed in a small cell base station according to the embodiment.

FIG. 9 is a flowchart illustrating an example of the flow of the quality improvement determination process executed in the small cell base station 10 according to the present embodiment.

As illustrated in FIG. 9, first, the small cell base station 10 determines whether the bandwidth of the CC subjected to quality improvement is greater than the bandwidth of the target CC (step S102).

Second, the small cell base station 10 determines whether the SNR of the CC subjected to quality improvement is less than or equal to a threshold value (step S104). It is desirable for the threshold value to be set from approximately 0 dB to 30 dB, for example. This is because, in the case in which the SNR is equal to or greater than a predetermined value, the need for quality improvement is considered to be weak, even if the received power (or the received power density) is smaller than the received power (or the received power density) of another CC. Note that the small cell base station 10 acquires the SNR from a measurement report from the terminal apparatus 20.

Third, the small cell base station 10 determines whether the SNR of the CC subjected to quality improvement is less favorable than the SNR of the target CC by a predetermined value or greater. For example, in the case in which the SNR of the target CC is 28 dB and the predetermined value is 10 dB, a CC whose SNR is less than or equal to 18 dB becomes a subject of the quality improvement process.

In the case of determining that all of these first to third conditions are satisfied (step S102/YES, step S104/YES, and step S106/YES), the small cell base station 10 performs the quality improvement process (step S108). On the other hand, in the case of determining that any one of the first to third conditions is not satisfied (step S102/NO, step S104/NO, or step S106/NO), the small cell base station 10 deactivates the CC subjected to quality improvement (step S110).

With the above, the process ends.

4. SECOND EMBODIMENT

<4.1. Technical Problem>

In LTE at the present time, the eNB activates a CC on the basis of a measurement report from the UE. For this reason, first, the UE measures the quality of the CC to activate, and reports the result to the eNB. Subsequently, on the basis of the measurement report, the eNB determines whether or not to allow activation of the CC.

The system 1 that uses the millimeter-wave band is also taken to follow the above procedure. In this case, the setting of the measurement report trigger becomes important. This is because, in the case in which the transmission of the measurement report is not performed appropriately, there is a risk that the CC will not be activated.

The following indicates examples of measurement report triggers in LTE at the present time.

Event A3

Event A3 is triggered when a neighboring cell becomes more favorable than the serving cell by an offset. According to this trigger, the UE reports in the case in which the quality of the CC subjected to measurement is more favorable than the CC currently in use by an offset. For example, the UE reports if the quality is 5 dB more favorable than the CC currently in use.

Event A6

Event A6 is triggered when a neighboring cell becomes more favorable than a secondary cell by an offset. This trigger is used in the case in which the UE further adds a CC under the conditions of performing carrier aggregation. The UE treats not the primary cell, but a specific secondary cell as a reference, and reports in the case in which a CC more favorable than the reference secondary cell by an offset exists.

The above describes examples of measurement report triggers. Other measurement reports also exist, but are basically variations of the above. It can be said that the measurement report triggers in LTE at the present time aim to search to a more favorable CC.

Herein, according to the first embodiment, the system 1 is capable of improving the quality of a CC. Thus, a case is conceivable in which even a CC not considered to be more favorable than the CC in use at the stage before performing the quality improvement process is more favorable than the CC in use at the stage after performing the quality improvement process. For this reason, it is desirable to design a measurement report trigger that accounts for the effects of the quality improvement process (that is, the room for improvement of quality).

<4.2. Technical Features>

The small cell base station 10 (for example, the reporting unit 153) reports information for computing an improved downlink quality to the terminal apparatus 20 that connects to the small cell 11. By referencing this information, the terminal apparatus 20 becomes able to compute the downlink quality assuming the case in which the quality improvement process is performed, and becomes able to report the measurement report at an appropriate timing. Hereinafter, the information for computing the improved downlink quality is also designated the room-for-improvement information. The room-for-improvement information may be reported using system information, or may be reported using dedicated signaling, for example.

The terminal apparatus 20 (for example, the measurement processing unit 241) measures the downlink quality (such as the radio wave strength or the SNR, for example) of the CC used in the small cell 11. Next, the terminal apparatus 20 (for example, the reporting unit 243) computes, on the basis of the measurement result, the downlink quality assuming the case in which the quality improvement process is performed by the small cell base station 10. Additionally, the terminal apparatus 20 (for example, the reporting unit 243) reports the measurement result (that is, the measurement report) to the small cell base station 10 on the basis of the computation result. By this report, it becomes possible to cause the small cell base station 10 to perform the quality improvement process. Specifically, the small cell base station 10 computes the effect of the quality improvement process on the basis of the measurement report to decide whether or not to perform the quality improvement process, and in the case of performing the quality improvement process, decides the content to perform.

Note that the terminal apparatus 20 may also report the content and the computation result of the assumed quality improvement process together with the measurement result, or instead of the measurement result. In this case, the load of the process of deciding whether or not to perform the quality improvement process and the content to perform in the small cell base station 10 may be reduced.

The terminal apparatus 20 (for example, the reporting unit 243) computes the downlink quality assuming the case in which the quality improvement process is improved, on the basis of the room-for-improvement information obtained from the small cell base station 10. By being based on the room-for-improvement information, the terminal apparatus 20 becomes able to appropriately compute the effect of the quality improvement process by the small cell base station 10.

The terminal apparatus 20 (for example, the reporting unit 243) reports that the computation result is more favorable than the downlink quality of the CC in use as a trigger. With this arrangement, the small cell base station 10 is able to receive the report at a timing appropriate for performing the quality improvement process. An example of a set measurement report trigger is illustrated below.

Event Z1

Event Z1 is triggered when a neighboring cell becomes more favorable than the serving cell by an offset that accounts for the room for quality improvement. In other words, the terminal apparatus 20 reports to the small cell base station 10 in the case in which the downlink quality computed assuming the case in which the quality improvement process is performed is more favorable than the quality of the CC currently in use by an offset.

Hereinafter, the room-for-improvement information will be described in detail.

The room-for-improvement information may also include information indicating CCs in which cutting the bandwidth is possible, and information indicating conditions for cutting. With this arrangement, the terminal apparatus 20 (for example, the reporting unit 243) becomes able to compute the downlink quality assuming the above first quality improvement process is performed. Specifically, the room-for-improvement information may include information indicating which CCs can be cut (that is, narrowed) by how much bandwidth, information indicating how long a time cutting is possible, and the like. For example, the room-for-improvement information includes information such as that it is possible to cut the bandwidth of a certain CC with a 200 MHz width, and the CC can be set to a width of 10 MHz at minimum. Note that in the case in which the first quality improvement process is being performed in the small cell base station 10, the room-for-improvement information may also include information indicating the level. For example, the room-for-improvement information includes information such as that a certain CC with a 200 MHz width is in operation at a width of 100 MHz. Also, even while the first quality improvement process is being performed, it is desirable for a reference signal for measurement to be transmitted over the entire bandwidth (that is, even including the cut bandwidth).

The room-for-improvement information may also include information indicating CCs which can be cut, and information indicating conditions for cutting. With this arrangement, the terminal apparatus 20 (for example, the reporting unit 243) becomes able to compute the downlink quality assuming the above second quality improvement process is performed. Specifically, the room-for-improvement information may include information indicating which CCs are grouped with each other, information indicating whether or not CCs within a group can be cut, information indicating how many CCs can be cut, information indicating how long a time cutting is possible, and the like. Note that in the case in which the second quality improvement process is being performed in the small cell base station 10, the room-for-improvement information may also include information indicating the level. For example, the room-for-improvement information includes information such as that, among 10 CCs included in a certain group, eight have been cut, and two are in operation. Also, even while the second quality improvement process is being performed, it is desirable for a reference signal for measurement to be transmitted over all CCs (that is, even including the cut CCs).

The room-for-improvement information may also include information indicating the difference between the antenna gain of the reference signal and a maximum antenna gain. Additionally, the room-for-improvement information may also include information indicating the number of beams usable at the same frequency and at the same time, the number of beams which can be cut, how long a time cutting is possible, and the like. With this arrangement, the terminal apparatus 20 (for example, the reporting unit 243) becomes able to compute the downlink quality assuming the above third quality improvement process is performed.

The room-for-improvement information may also be associated with a group including multiple CCs. In this case, the small cell base station 10 (for example, the reporting unit 153) sets and reports room-for-improvement information for each group. In the system 1 that uses the millimeter-wave band, the number of CCs used may become very large. In the case in which room-for-improvement information is set and reported with regard to each CC, the reporting-related overhead increases. In this point, by associating the room-for-improvement information with a group, it becomes possible to reduce such overhead. The table below illustrates an example of grouped room-for-improvement information.

TABLE 2

| Group name | CCs included | Frequency band | Gain by cutting bandwidth (first quality improvement process) | Gain by cutting number of beams (third quality improvement process) |
|---|---|---|---|---|
| Group 1 | CC1, CC2, CC3 | 10 GHz | 3 dB | 10 dB |
| Group 2 | CC4, CC5, CC6 | 30 GHz | 10 dB | 20 dB |
| Group 3 | CC7, CC8, CC9 | 60 GHz | 20 dB | 30 dB |

As illustrated in the above table, information related to the first and third quality improvement processes is included in each of the room-for-improvement information. The CCs included in a group is also information related to the second quality improvement process.

The above describes the technical features of the present embodiment. Next, the flow of the process will be described.
<4.3. Flow of Process>

Figure 10:
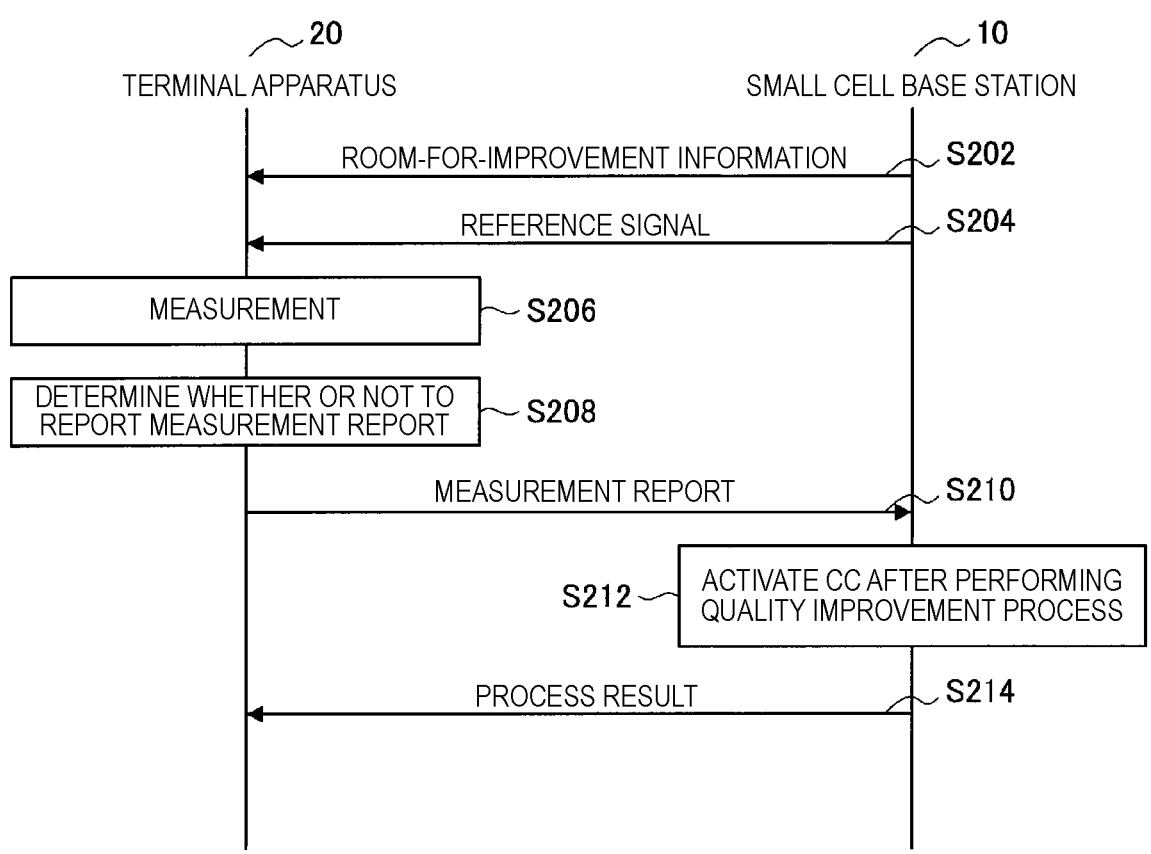
FIG. 10 is a sequence diagram illustrating an example of the flow of a quality improvement process executed in a system according to the second embodiment.

FIG. 10 is a sequence diagram illustrating an example of the flow of the quality improvement process executed in the system 1 according to the present embodiment. This sequence involves the small cell base station 10 and the terminal apparatus 20.

As illustrated in FIG. 10, first, the small cell base station 10 transmits the room-for-improvement information to the terminal apparatus 20 (step S202).

Next, the small cell base station 10 transmits the reference signal to the terminal apparatus 20 (step S204). Note that the small cell base station 10 transmits the reference signal periodically (typically, continuously) to the terminal apparatus 20.

Next, the terminal apparatus 20 performs measurement. Specifically, the terminal apparatus 20 computes the downlink quality (for example, the SNR), on the basis of the result of receiving the reference signal transmitted from the small cell base station 10 (step S206).

Next, the terminal apparatus 20 determines whether or not to report a measurement report, on the basis of the room-for-improvement information (step S208). For example, the terminal apparatus 20 computes the downlink quality in the case in which the quality improvement process is performed in the small cell base station 10. Subsequently, the terminal apparatus 20 determines to report if the computed downlink quality is more favorable than the downlink quality of the CC currently in use by an offset, and determines not to report if the compute downlink quality is less favorable.

Subsequently, in the case of determining to report the measurement report, the terminal apparatus 20 transmits a measurement report message to the small cell base station 10 (step S210).

Next, the small cell base station 10, after performing the quality improvement process, activates the CC on which the quality improvement process was performed with respect to the terminal apparatus 20 from which the reporting of the measurement report originated (step S212). At this time, the small cell base station 10 decides whether or not to perform the quality improvement process and the content to perform on the basis of the measurement report, and performs the quality improvement process in accordance with the decision result.

Next, the small cell base station 10 transmits information indicating the processing result by the above step S212 to the terminal apparatus 20 (step S214). The processing result herein include the performed content of the quality improvement process.

After the above steps, the process ends.

5. APPLICATION EXAMPLES

The technology according to the present disclosure is applicable to various products. The wireless communication apparatus 10 may also be implemented, for example, as any type of evolved Node B (eNB) such as macro eNBs and small eNBs. Small eNBs may be eNBs that cover smaller cells than the macrocells, such as pico eNBs, micro eNBs, or home (femto) eNBs. Instead, the wireless communication apparatus 10 may be implemented as another type of base station such as Nodes B or base transceiver stations (BTSs). The wireless communication apparatus 10 may include the main apparatus (which is also referred to as base station apparatus) that controls wireless communication and one or more remote radio heads (RRHs) that are disposed at different locations from that of the main apparatus. Also, various types of terminals described below may function as the wireless communication apparatus 10 by temporarily or semi-permanently executing the functionality of the base station. Furthermore, at least some of structural elements of the wireless communication apparatus 10 may be realized in a base station apparatus or a module for a base station apparatus.

Further, the terminal apparatus 20 may be implemented, for example, as a mobile terminal such as smartphones, tablet personal computers (PCs), notebook PCs, portable game terminals, portable/dongle mobile routers, and digital cameras, or an in-vehicle terminal such as car navigation apparatuses. Further, the terminal apparatus 20 may be implemented as a machine type communication (MTC) terminal for establishing a machine to machine (M2M) communication. Furthermore, at least some of structural elements of the terminal apparatus 20 may be implemented as a module (e.g., integrated circuit module including a single die) that is mounted on these terminals.

<5.1. Application Examples for Base Station>
(First Application Example)

Figure 11:
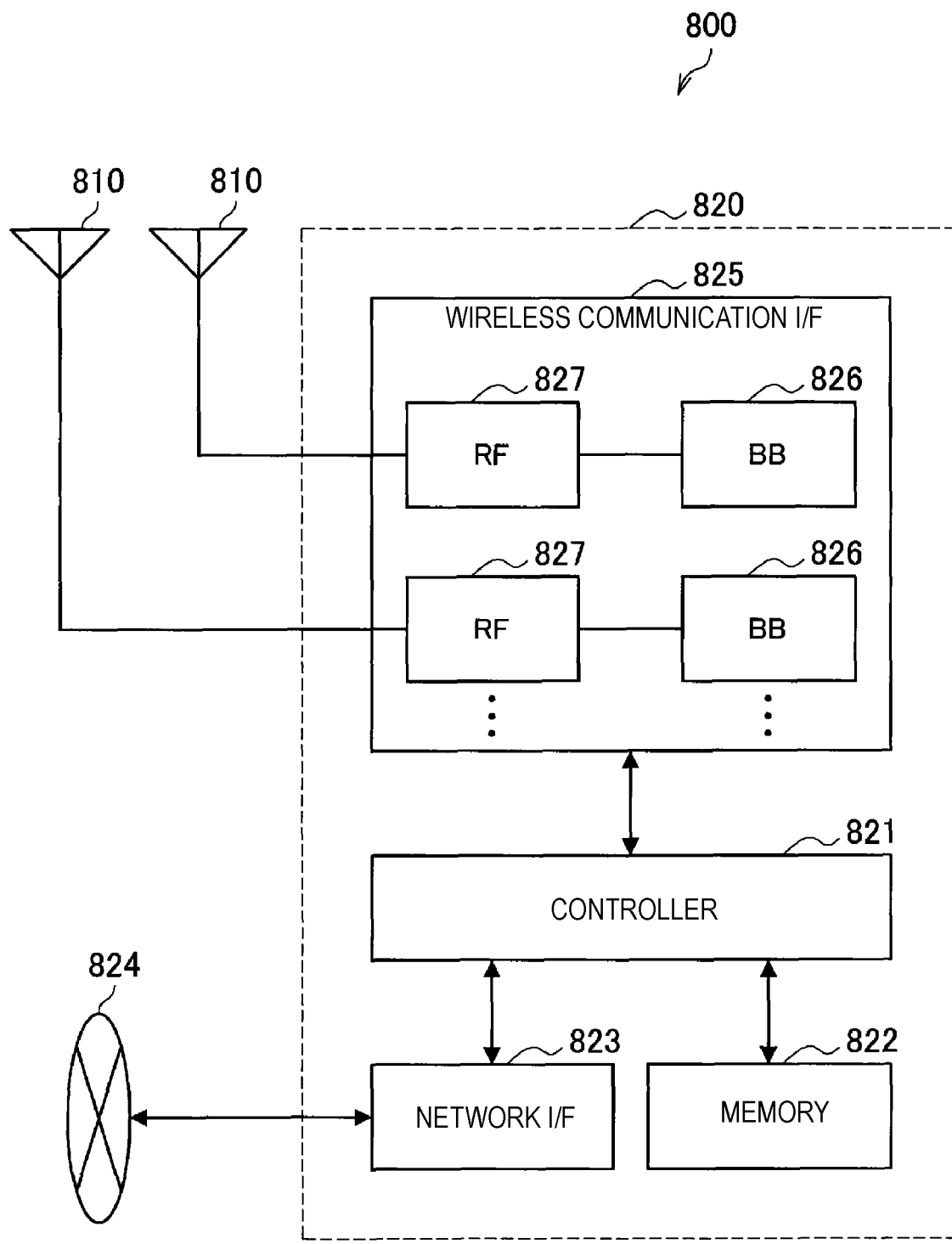
FIG. 11 is a block diagram illustrating a first example of a schematic configuration of an eNB.

FIG. 11 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g., a plurality of antenna elements constituting a MIMO antenna) and is used for the base station apparatus 820 to transmit and receive a wireless signal. The eNB 800 may include the plurality of the antennas 810 as illustrated in FIG. 11, and the plurality of antennas 810 may, for example, correspond to a plurality of frequency bands used by the eNB 800. It should be noted that while FIG. 11 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. Further, the controller 821 may also have a logical function of performing control such as radio resource control, radio bearer control, mobility management, admission control, and scheduling. Further, the control may be performed in cooperation with a surrounding eNB or a core network node. The memory 822 includes RAM and ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the eNB 800 may be connected to a core network node or another eNB through a logical interface (e.g., S1 interface or X2 interface). The network interface 823 may be a wired communication interface or a wireless communication interface for wireless backhaul. In the case where the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826, an RF circuit 827, and the like. The BB processor 826 may, for example, perform encoding/decoding, modulation/demodulation, multiplexing/demultiplexing, and the like, and performs a variety of signal processing on each layer (e.g., L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. Further, the module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 11, and the plurality of BB processors 826 may, for example, correspond to a plurality of frequency bands used by the eNB 800. Further, the wireless communication interface 825 may also include a plurality of the RF circuits 827, as illustrated in FIG. 11, and the plurality of RF circuits 827 may, for example, correspond to a plurality of antenna elements. Note that FIG. 11 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 11, one or more structural elements included in the processing unit 150 (the transmission processing unit 151 and/or the reporting unit 153) described with reference to FIG. 5 may be implemented by the wireless communication interface 825. Alternatively, at least some of these structural elements may be implemented by the controller 821. As an example, a module which includes a part (for example, the BB processor 826) or all of the wireless communication interface 825 and/or the controller 821 may be mounted in the eNB 800, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the eNB 800, and the wireless communication interface 825 (for example, the BB processor 826) and/or the controller 821 may execute the program. As described above, the eNB 800, the base station apparatus 820, or the module may be provided as an apparatus which includes the one or more structural elements, and the program for causing the processor to function as the one or more structural elements may be provided. In addition, a readable recording medium in which the program is recorded may be provided.

In addition, in the eNB 800 illustrated in FIG. 11, the wireless communication unit 120 described with reference to FIG. 5 may be implemented by the wireless communication interface 825 (for example, the RF circuit 827). Moreover, the antenna unit 110 may be implemented by the antenna 810. In addition, the network communication unit 130 may be implemented by the controller 821 and/or the network interface 823. Further, the storage unit 140 may be implemented by the memory 822.

(Second Application Example)

Figure 12:
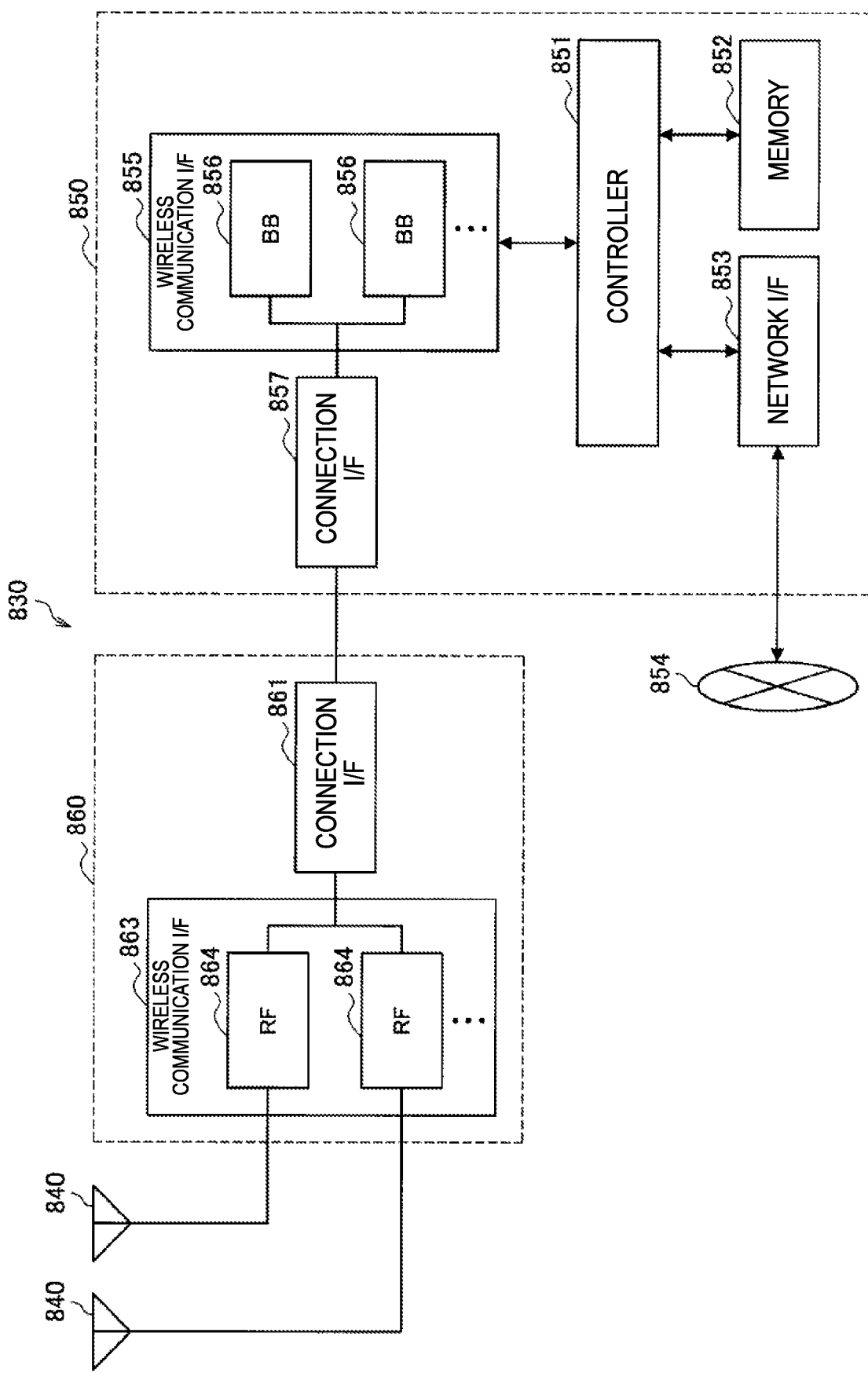
FIG. 12 is a block diagram illustrating a second example of the schematic configuration of the eNB.

FIG. 12 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. Further, the base station apparatus 850 and the RRH 860 may be connected to each other by a high speed line such as optical fiber cables.

Each of the antennas 840 includes a single or a plurality of antenna elements (e.g., antenna elements constituting a MIMO antenna), and is used for the RRH 860 to transmit and receive a wireless signal. The eNB 830 may include a plurality of the antennas 840 as illustrated in FIG. 12, and the plurality of antennas 840 may, for example, correspond to a plurality of frequency bands used by the eNB 830. Note that FIG. 12 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 11.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856 or the like. The BB processor 856 is similar to the BB processor 826 described with reference to FIG. 11 except that the BB processor 856 is connected to an RF circuit 864 of the RRH 860 via the connection interface 857. The wireless communication interface 855 may include a plurality of the BB processors 856, as illustrated in FIG. 12, and the plurality of BB processors 856 may, for example, correspond to a plurality of frequency bands used by the eNB 830. Note that FIG. 12 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication on the high speed line.

The wireless communication interface 863 transmits and receives a wireless signal via the antenna 840. The wireless communication interface 863 may typically include the RF circuit 864 or the like. The RF circuit 864 may include a mixer, a filter, an amplifier and the like, and transmits and receives a wireless signal via the antenna 840. The wireless communication interface 863 may include a plurality of the RF circuits 864 as illustrated in FIG. 12, and the plurality of RF circuits 864 may, for example, correspond to a plurality of antenna elements. Note that FIG. 12 illustrates an example in which the wireless communication interface 863 includes the plurality of RF circuits 864, but the wireless communication interface 863 may include the single RF circuit 864.

In the eNB 830 illustrated in FIG. 12, one or more structural elements included in the processing unit 150 (the transmission processing unit 151 and/or the reporting unit 153) described with reference to FIG. 5 may be implemented by the wireless communication interface 855 and/or the wireless communication interface 863. Alternatively, at least some of these structural elements may be implemented by the controller 851. As an example, a module which includes a part (for example, the BB processor 856) or all of the wireless communication interface 855 and/or the controller 851 may be mounted in the eNB 830, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the eNB 830, and the wireless communication interface 855 (for example, the BB processor 856) and/or the controller 851 may execute the program. As described above, the eNB 830, the base station apparatus 850, or the module may be provided as an apparatus which includes the one or more structural elements, and the program for causing the processor to function as the one or more structural elements may be provided. In addition, a readable recording medium in which the program is recorded may be provided.

In addition, in the eNB 830 illustrated in FIG. 12, for example, the wireless communication unit 120 described with reference to FIG. 5 may be implemented by the wireless communication interface 863 (for example, the RF circuit 864). Moreover, the antenna unit 110 may be implemented by the antenna 840. In addition, the network communication unit 130 may be implemented by the controller 851 and/or the network interface 853. Further, the storage unit 140 may be implemented by the memory 852.

<5.2. Application Examples for Terminal Apparatus>

(First Application Example)

Figure 13:
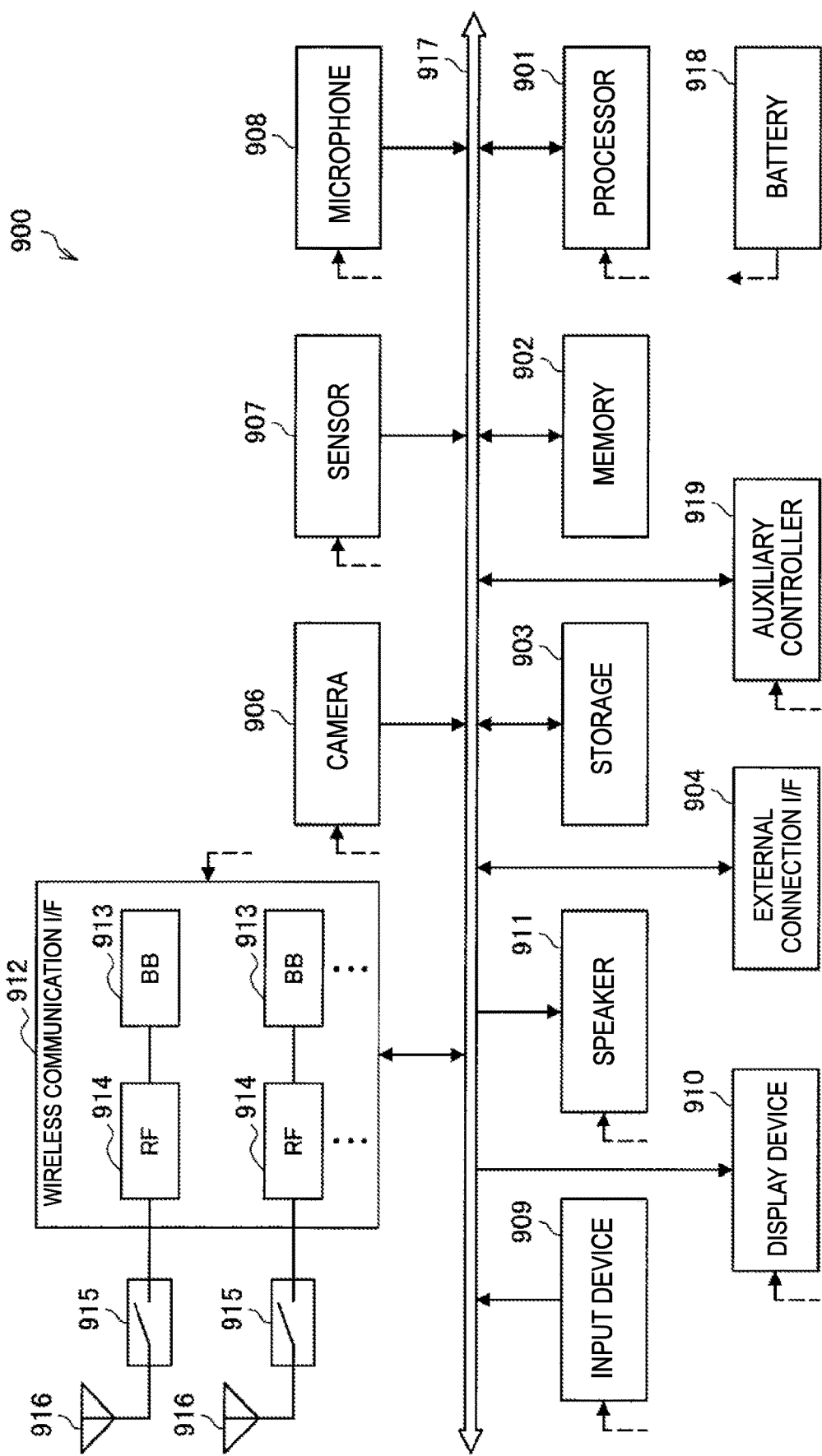
FIG. 13 is a block diagram illustrating an example of a schematic configuration of a smartphone.

FIG. 13 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls the functions of an application layer and other layers of the smartphone 900. The memory 902 includes RAM and ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes, for example, an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, an acceleration sensor and the like. The microphone 908 converts a sound that is input into the smartphone 900 to an audio signal. The input device 909 includes, for example, a touch sensor which detects that a screen of the display device 910 is touched, a key pad, a keyboard, a button, a switch or the like, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 13. Note that FIG. 13 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 13. Note that FIG. 13 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies electric power to each block of the smartphone 900 illustrated in FIG. 13 via a feeder line that is partially illustrated in the figure as a dashed line. The auxiliary controller 919, for example, operates a minimally necessary function of the smartphone 900 in a sleep mode.

In the smartphone 900 illustrated in FIG. 13, one or more structural elements included in the processing unit 240 (the measurement processing unit 241 and/or the reporting unit 243) described with reference to FIG. 6 may be implemented by the wireless communication interface 912. Alternatively, at least some of these structural elements may be implemented by the processor 901 or the auxiliary controller 919. As an example, a module which includes a part (for example, the BB processor 913) or all of the wireless communication interface 912, the processor 901, and/or the auxiliary controller 919 may be mounted in the smartphone 900, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the smartphone 900, and the wireless communication interface 912 (for example, the BB processor 913), the processor 901, and/or the auxiliary controller 919 may execute the program. As described above, the smartphone 900 or the module may be provided as an apparatus which includes the one or more structural elements, and the program for causing the processor to function as the one or more structural elements may be provided. In addition, a readable recording medium in which the program is recorded may be provided.

In addition, in the smartphone 900 illustrated in FIG. 13, for example, the wireless communication unit 220 described with reference to FIG. 6 may be implemented by the wireless communication interface 912 (for example, the RF circuit 914). Moreover, the antenna unit 210 may be implemented by the antenna 916. Further, the storage unit 230 may be implemented by the memory 902.

(Second Application Example)

Figure 14:
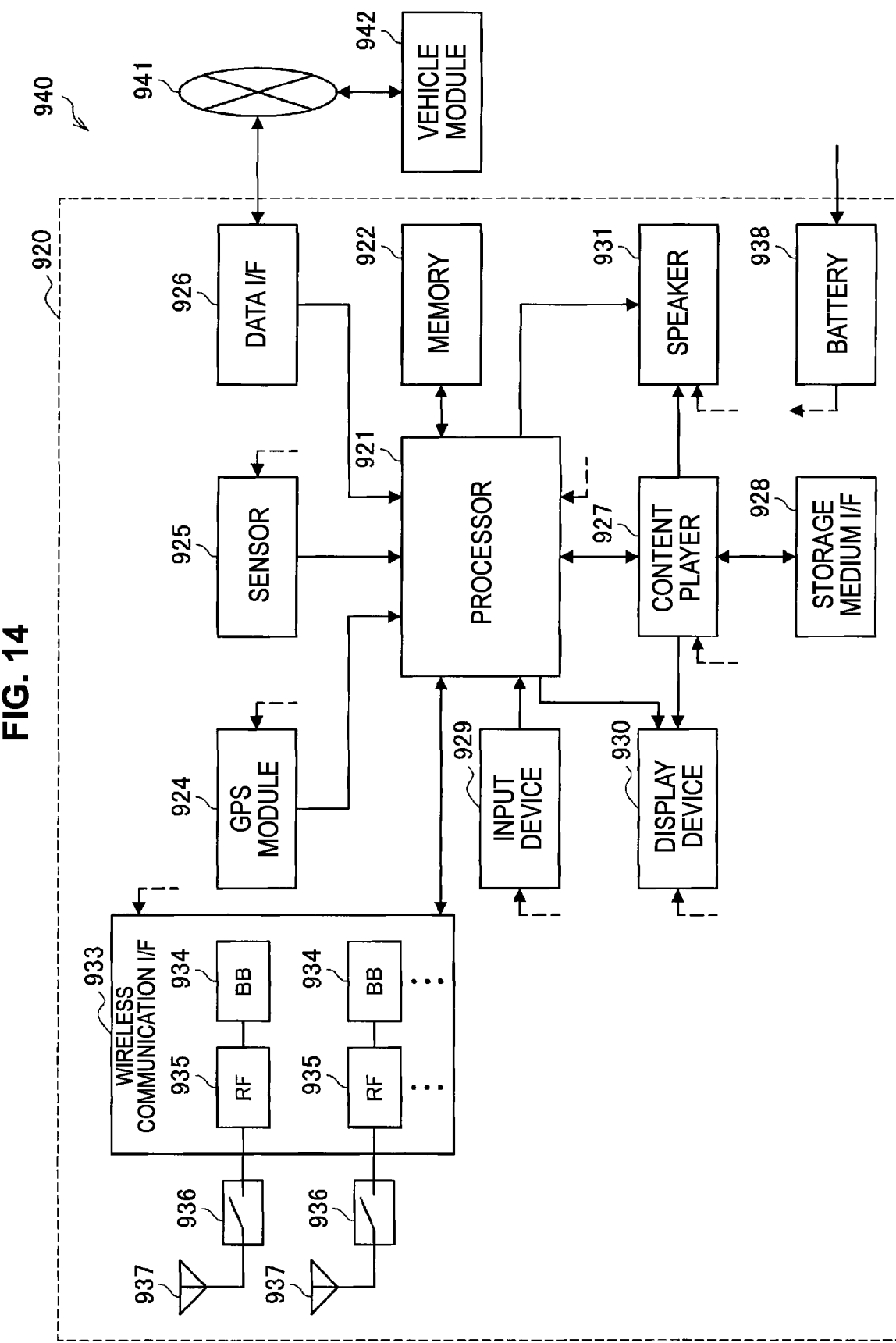
FIG. 14 is a block diagram illustrating an example of a schematic configuration of a car navigation apparatus.

FIG. 14 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes RAM and ROM, and stores a program executed by the processor 921 and data.

The GPS module 924 uses a GPS signal received from a GPS satellite to measure the position (e.g., latitude, longitude, and altitude) of the car navigation apparatus 920. The sensor 925 may include a sensor group including, for example, a gyro sensor, a geomagnetic sensor, a barometric sensor and the like. The data interface 926 is, for example, connected to an in-vehicle network 941 via a terminal that is not illustrated, and acquires data such as vehicle speed data generated on the vehicle side.

The content player 927 reproduces content stored in a storage medium (e.g., CD or DVD) inserted into the storage medium interface 928. The input device 929 includes, for example, a touch sensor which detects that a screen of the display device 930 is touched, a button, a switch or the like, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 14. Note that FIG. 14 illustrates an example in which the wireless communication interface 933 includes a plurality of BB processors 934 and a plurality of RF circuits 935, but the wireless communication interface 933 may include a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 may include a plurality of antennas 937 as illustrated in FIG. 14. Note that FIG. 14 illustrates an example in which the car navigation apparatus 920 includes a plurality of antennas 937, but the car navigation apparatus 920 may include a single antenna 937.

Further, the car navigation apparatus 920 may include the antenna 937 for each wireless communication system. In this case, the antenna switch 936 may be omitted from a configuration of the car navigation apparatus 920.

The battery 938 supplies electric power to each block of the car navigation apparatus 920 illustrated in FIG. 14 via a feeder line that is partially illustrated in the figure as a dashed line. Further, the battery 938 accumulates the electric power supplied from the vehicle.

In the car navigation apparatus 920 illustrated in FIG. 14, one or more structural elements included in the processing unit 240 (the measurement processing unit 241 and/or the reporting unit 243) described with reference to FIG. 6 may be implemented by the wireless communication interface 933. Alternatively, at least some of these structural elements may be implemented by the processor 921. As an example, a module which includes a part (for example, the BB processor 934) or all of the wireless communication interface 933 and/or the processor 921 may be mounted in the car navigation apparatus 920, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the car navigation apparatus 920, and the wireless communication interface 933 (for example, the BB processor 934) and/or the processor 921 may execute the program. As described above, the car navigation apparatus 920 or the module may be provided as an apparatus which includes the one or more structural elements, and the program for causing the processor to function as the one or more structural elements may be provided. In addition, a readable recording medium in which the program is recorded may be provided.

In addition, in the car navigation apparatus 920 illustrated in FIG. 14, for example, the wireless communication unit 220 described with reference to FIG. 6 may be implemented by the wireless communication interface 933 (for example, the RF circuit 935). Moreover, the antenna unit 210 may be implemented by the antenna 937. Further, the storage unit 230 may be implemented by the memory 922.

The technology of the present disclosure may also be realized as an in-vehicle system (or a vehicle) 940 including one or more blocks of the car navigation apparatus 920, the in-vehicle network 941, and a vehicle module 942. In other words, the in-vehicle system (or a vehicle) 940 may be provided as an apparatus which includes the measurement processing unit 241 and the reporting unit 243. The vehicle module 942 generates vehicle data such as vehicle speed, engine speed, and trouble information, and outputs the generated data to the in-vehicle network 941.

6. CONCLUSION

The above describes an embodiment of the present disclosure in detail, with reference to FIGS. 1 to 14. As described above, the small cell base station 10 according to the present embodiment improves the downlink quality of a unit frequency band used in the small cell 11 to operate by limiting the resources used for downlink transmission. With this arrangement, it becomes possible to improve the quality of a unit frequency band of unfavorable quality which would not have been used in the past up to a level suitable for use. With this arrangement, it becomes possible to efficiently operate vast millimeter-wave band resources, and the traffic accommodation ratio of the terminal apparatus 20 on a cellular network is improved.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Note that it is not necessary for the processing described in this specification with reference to the flowchart and the sequence diagram to be executed in the order shown in the flowchart and the sequence diagram. Some processing steps may be performed in parallel. Further, some of additional steps can be adopted, or some processing steps can be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An apparatus that operates a small cell, the apparatus including:
a processing unit configured to improve a downlink quality of a unit frequency band used in the small cell by limiting resources used for downlink transmission.

(2)
The apparatus according to (1), in which
the processing unit reports information for computing an improved downlink quality to a terminal that connects to the small cell.

(3)
The apparatus according to (2), in which
the information for computing the improved downlink quality includes information indicating the unit frequency band in which cutting a bandwidth is possible, and information indicating a condition for cutting.

(4)
The apparatus according to (2) or (3), in which
the information for computing the improved downlink quality includes information indicating the unit frequency band that can be cut, and information indicating a condition for cutting.

(5)
The apparatus according to any one of (2) to (4), in which
the information for computing the improved downlink quality includes information indicating a difference between an antenna gain of a reference signal and a maximum antenna gain.

(6)
The apparatus according to any one of (2) to (5), in which
the information for computing the improved downlink quality is associated with a group that includes a plurality of the unit frequency bands.

(7)
The apparatus according to any one of (1) to (6), in which
the processing unit concentrates a transmit power on limited resources.

(8)
The apparatus according to (7), in which
the processing unit cuts a bandwidth of the unit frequency band used for downlink transmission.

(9)
The apparatus according to (7) or (8), in which
the processing unit cuts a number of unit frequency bands used for downlink transmission.

(10)
The apparatus according to any one of (7) to (9), in which
the processing unit cuts a number of beams used for downlink transmission.

(11)
The apparatus according to any one of (7) to (10), in which
the processing unit improves the downlink quality of the unit frequency band subjected to quality improvement on a basis of the downlink quality of another unit frequency band treated as a target.

(12)
The apparatus according to any one of (7) to (11), in which
the processing unit differentiates a resource-limiting content between the small cell and another neighboring cell.

(13)
The apparatus according to any one of (7) to (12), in which
the processing unit switches between limiting and not limiting the resources, and in a case of limiting, switches a content of the limiting at intervals of a unit time.

(14)
The apparatus according to (13), in which
the unit time is 0.5 milliseconds.

(15)
The apparatus according to any one of (1) to (14), in which
the unit frequency band is a component carrier.

(16)
An apparatus that connects to a small cell, the apparatus including:
a processing unit configured to measure a downlink quality of a unit frequency band used in the small cell, compute a measurement result of the downlink quality assuming a case in which a quality improvement process is performed by a base station, and report the measurement result to the base station on a basis of a result of the computation.

(17)
The apparatus according to (16), in which
the processing unit reports upon a trigger of the computation result being more favorable than the downlink quality of the unit frequency band currently in use.

(18)
The apparatus according to (16) or (17), in which
the processing unit computes the downlink quality assuming the case in which the quality improvement process is performed, on a basis of information for computing an improved downlink quality obtained from base station.

(19)
A method including:
operating a small cell; and
improving, by a processor, a downlink quality of a unit frequency band used in the small cell by limiting resources used for downlink transmission.

(20)
A method including:
connecting to a small cell; and
measuring, by a processor, a downlink quality of a unit frequency band used in the small cell, computing a measurement result of the downlink quality assuming a case in which a quality improvement process is performed by a base station, and reporting the measurement result to the base station on a basis of a result of the computation.

REFERENCE SIGNS LIST 1 system
10 small cell base station
11 small cell
15 core network
16 packet data network
20 terminal apparatus
30 macro cell base station
31 macro cell
110 antenna unit
120 wireless communication unit
130 network communication unit
140 storage unit
150 processing unit
151 transmission processing unit
153 reporting unit
210 antenna unit
220 wireless communication unit
230 storage unit
240 processing unit
241 measurement processing unit
243 reporting unit

The invention claimed is:

1. An apparatus that operates a small cell, the apparatus comprising:
processing circuitry configured to
cut a number of beams used for downlink transmission on resources;
concentrate a transmission power on the resources so as to improve a downlink quality of a unit frequency band used in the small cell; and
report information for computing an improved downlink quality, the information being reported to a terminal that connects to the small cell, and the information indicating a difference between an antenna gain of a reference signal and a maximum antenna gain.

2. The apparatus according to claim 1, wherein the information further indicates the unit frequency band in which cutting a bandwidth is possible, and information indicating a condition for cutting.

3. The apparatus according to claim 1, wherein the information further indicates the unit frequency band that can be cut, and information indicating a condition for cutting.

4. The apparatus according to claim 1, wherein the information for computing the improved downlink quality is associated with a group that includes a plurality of unit frequency bands.

5. The apparatus according to claim 1, wherein the processing circuitry cuts a bandwidth of the unit frequency band used for downlink transmission.

6. The apparatus according to claim 1, wherein the processing circuitry cuts a number of unit frequency bands used for downlink transmission.

7. The apparatus according to claim 1, wherein the processing circuitry improves a first downlink quality of the unit frequency band subjected to quality improvement on a basis of a second downlink quality of another unit frequency band treated as a target.

8. The apparatus according to claim 1, wherein the processing circuitry differentiates a resource-limiting content between the small cell and another neighboring cell.

9. The apparatus according to claim 1, wherein the processing circuitry switches between limiting and not limiting resources, and in a case of limiting, switches a content of the limiting at intervals of a unit time.

10. The apparatus according to claim 9, wherein the unit time is 0.5 milliseconds.

11. The apparatus according to claim 1, wherein the unit frequency band is a component carrier.

12. A method, comprising:
operating, by processing circuitry, a small cell;
cutting, by the processing circuitry, a number of beams used for downlink transmission on resources;
concentrating, by the processing circuitry, a transmission power on the resources so as to improve a downlink quality of a unit frequency band used in the small cell; and
reporting, by the processing circuitry, information for computing an improved downlink quality, the information being reported to a terminal that connects to the small cell, and the information indicating a difference between an antenna gain of a reference signal and a maximum antenna gain.

* * * * *